United States Patent
Slagboom et al.

(10) Patent No.: US 11,350,639 B2
(45) Date of Patent: Jun. 7, 2022

(54) METHOD OF MECHANICALLY HARVESTING INNER AND OUTER MEAT FILLETS FROM POULTRY CARCASS BREAST CAPS, AND A DEVICE FOR CARRYING OUT THE METHOD

(71) Applicant: Foodmate B.V., Numansdorp (NL)

(72) Inventors: Rijk Slagboom, Numansdrop (NL); David Scott Hazenbroek, Numansdorp (NL)

(73) Assignee: Foodmate B.V., Numansdorp (NL)

( * ) Notice: Subject to any disclaimer, the term of this patent is extended or adjusted under 35 U.S.C. 154(b) by 593 days.

(21) Appl. No.: 16/072,924

(22) PCT Filed: Jan. 26, 2017

(86) PCT No.: PCT/NL2017/050051
§ 371 (c)(1),
(2) Date: Jul. 26, 2018

(87) PCT Pub. No.: WO2017/131519
PCT Pub. Date: Aug. 3, 2017

(65) Prior Publication Data
US 2019/0037862 A1    Feb. 7, 2019

(30) Foreign Application Priority Data
Jan. 26, 2016    (NL) ..................................... 2016160

(51) Int. Cl.
A22C 21/00    (2006.01)
(52) U.S. Cl.
CPC ................................ A22C 21/003 (2013.01)

(58) Field of Classification Search
CPC .... A22C 21/00; A22C 21/003; A22C 21/0053
(Continued)

(56) References Cited

U.S. PATENT DOCUMENTS 4,993,114 A * 2/1991 Meyer .................. A22C 21/003
452/136
5,336,127 A * 8/1994 Hazenbroek ....... A22C 21/0023
452/160

(Continued)

FOREIGN PATENT DOCUMENTS

EP    1 731 038    12/2006
EP    1731038 A1    12/2006

OTHER PUBLICATIONS

International Search Report and Written Opinion in PCT/NL2017/050051 dated Apr. 12, 2017.
(Continued)

Primary Examiner — Richard T Price, Jr.
(74) Attorney, Agent, or Firm — Womble Bond Dickinson (US) LLP

(57) ABSTRACT

Method and device for carrying out the method of mechanically harvesting inner and outer meat fillets from a poultry carcass breast cap. A poultry breast cap (23) is conveyed while being supported inversed to its natural position on a carrier (17) through a path of conveyance (25). The outer fillet is cut along a keel bone of the poultry breast cap (23) to enable separation of the inner and outer fillets. After separation and successive harvesting of the outer and inner breast fillets the carcass remains are discarded. The device (1, 13) for carrying out the method comprises means (15, 17, 29, 31, 33, 35, 37, 39, 41, 43) for performing at least the steps of conveying, separating and harvesting inner and outer breast fillets, and discarding carcass remains.

12 Claims, 11 Drawing Sheets

Figure 1:
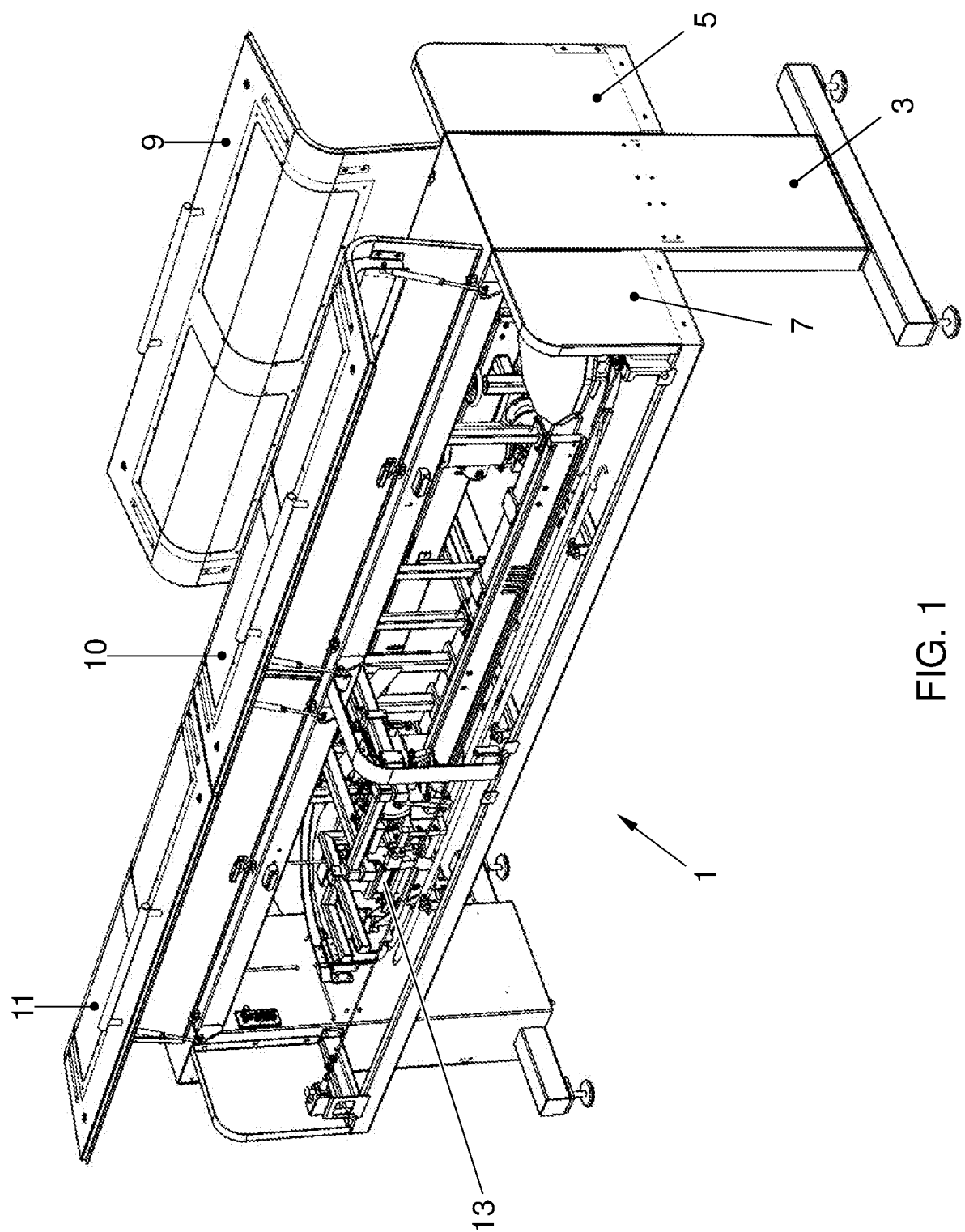

(58) Field of Classification Search
USPC .......................................... 452/135, 160, 170
See application file for complete search history.

(56) References Cited

U.S. PATENT DOCUMENTS

| | | | | |
|---|---|---|---|---|
| 5,697,837 A | * | 12/1997 | Verrijp ................. | A22C 21/003 452/136 |
| 5,833,527 A | * | 11/1998 | Hazenbroek ....... | A22C 21/0069 452/170 |
| 6,277,020 B1 | * | 8/2001 | Stephens ............ | A22C 21/0023 452/135 |
| 6,736,717 B1 | * | 5/2004 | Annema .............. | A22C 21/003 452/151 |

OTHER PUBLICATIONS

Communication in related EP patent 17704837.8 dated Sep. 4, 2018.
International Search Report and Written Opinion of the International Searching Authority in PCT/NL2017/050051 dated Apr. 12, 2017.
International Preliminary Report on Patentability in PCT/NL2017/050051 dated Jul. 31, 2018.

* cited by examiner

METHOD OF MECHANICALLY HARVESTING INNER AND OUTER MEAT FILLETS FROM POULTRY CARCASS BREAST CAPS, AND A DEVICE FOR CARRYING OUT THE METHOD

The invention relates to a method of mechanically harvesting inner and outer meat fillets from a poultry carcass breast cap, and a device for carrying out the method.

Method and devices for filleting poultry breast caps are known. In particular applicants' U.S. Pat. No. 9,078,453 relates to a method and device for deboning poultry breast caps to obtain breast fillets therefrom. This method and device has been successful in harvesting breast fillets, but only with the inner and outer fillets remaining together. It is however sometimes also required to have the inner and outer breast fillets as separate meat products. In such instances it has been necessary the separate the inner and outer breast fillets manually.

Accordingly it is an object of the present invention to propose, and embodiments of the present invention seek to provide, an improved method and device for mechanically harvesting inner and outer meat fillets from poultry carcass breast caps, when such is required. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides an improved method of mechanically harvesting inner and outer meat fillets from a poultry carcass breast cap, and an improved device for carrying out the method as defined in the appended claims.

In the method of mechanically harvesting inner and outer meat fillets from a poultry carcass breast cap, in accordance with the invention, a poultry breast cap is conveyed while it is supported inversed to its natural position on a carrier through a path of conveyance. In this method the outer fillet is cut along a keel bone of the poultry breast cap, the inner and outer fillets are separated, and the carcass remains are discarded. Such a method can further include providing an endless conveyor including the carrier and continuously moving the breast cap supported on the carrier through the path of conveyance. Optionally a furcular bone removing apparatus can be provided and a further step of conveying the poultry breast cap for engagement by the furcular bone removing apparatus for removing the furcular bone.

The method may also further comprise providing a first breast fillet working unit having laterally movable tunnel plates, and a step of engaging meat of the breast cap by the tunnel plates. Effectively the tunnel plates acts as scrapers and scrape between the inner and outer fillets to promote harvesting a subsequent stage. As an additional step the method can comprise providing a breast fillet cutter for performing cutting the outer fillet along the keel bone of the poultry breast cap. Effectively the breast fillet cutter splits the outer fillet to allow harvesting thereof in two halves.

Optionally a step can be included of providing a second breast fillet working unit with a guide structure and an up-and-down movable engagement member connected to the guide structure, thereby allowing the guide structure to pass centrally over the carrier and to position the engagement member at an appropriate level. Effectively the engagement member acting as a scraper plate prepares a front portion of the outer fillet for being gripped. The engagement member is lifted by engagement with the carrier.

The method according to the invention can also include a step of providing an inner and outer fillet separator, and performing separation of the outer fillet from the inner fillet of the breast cap meat. Effectively the inner and outer fillet separator harvests the now loosened outer fillets halves by allowing guide rods to act as grippers. A tissue or tendon cutter can be provided having cutting knifes capable of being moved inwardly and outwardly in a direction transverse to the path of conveyance, and cutting tissue can thereby be performed by moving the cutting knifes inwardly into engagement with the breast cap. Effectively the cutting knifes cut between the carcass and inner fillet for promoting a cleaner harvesting of same.

The method can also further comprise a step of providing a third breast fillet working unit having inwardly and outwardly movable guides, and enabling removing the inner fillet by moving the guides outwardly after having engaged the breast cap meat. The third breast fillet working unit effectively acts as a centering unit directly preceding an optionally provided carcass separator, allowing a step of operating the carcass separator for lifting the inner fillet from the carcass remains on the carrier, and thereby preparing the carcass remains for subsequent discarding by a carcass unloader or like implement.

The device in accordance with the invention comprises means for performing at least the steps of conveying, separating inner and outer breast fillets, and discarding carcass remains. The means for performing at least the steps of conveying, separating inner and outer breast fillets, and discarding carcass remains comprise: an endless conveyor extending along a predefined path of conveyance; at least one breast cap carrier arranged for being moved through the predefined path of conveyance by the endless conveyor; a first breast fillet working unit positioned in the path of conveyance; an optional breast cutter downstream of the first breast fillet working unit in the path of conveyance; a second fillet working unit downstream of the breast cutter in the path of conveyance; an inner and outer fillet separator unit downstream of the breast cutter in the path of conveyance; a tissue cutting unit down stream of the inner and outer fillet separator in the path of conveyance; a third fillet working unit downstream of the tissue cutting unit in the path of conveyance; and a carcass separator unit downstream of the third fillet working unit in the path of conveyance. Such a device can further comprising a carcass unloader downstream of the carcass separator unit in the path of conveyance defined by the conveyor.

Optionally the device can further comprise a common frame beam extending parallel to the path of conveyance for mounting one or more of the means for performing at least the steps of conveying, separating inner and outer breast fillets, and discarding carcass remains, while attaching same by mounting strips engaging over the common frame beam.

Conveniently in the device according to the invention, the first breast fillet working unit can comprise a pair of opposite arm elements each carrying a tunnel plate, together forming a pair of laterally movable tunnel plates, and opposite pneumatic cylinders for moving the opposite tunnel plates to and from one another. The first breast fillet working unit, acting as an outer fillet scraper, with its tunnel plates scrapes between the inner and outer fillet, which enhances harvesting by the second breast fillet working unit acting as an outer fillet harvester.

The optional breast cutter can comprise a motor drive unit for rotatably driving a double circular cutting blade and/or the double circular cutting blade is height adjustable with respect to the path of conveyance. The optional breast cutter, acting as a breast fillet splitter, cuts the fillet in half so that two halves of outer fillets can be harvested.

The second breast fillet working unit can have an up-and-down movable engagement member connected to a guide structure, and wherein the guide structure is arranged for engagement by the at least one breast cap carrier for positioning of the engagement member. The second breast fillet working unit, acting as an outer fillet scraper, loosens the front part of the outer fillet for later gripping by the inner and outer fillet separator, effectively acting as an outer fillet harvester. An engagement member acting as a scraper plate is mechanically lifted when it is engaged by a passing carrier.

The inner and outer fillet separator can comprise pivotable guide rods operated by pneumatic actuators for separation of the outer fillet from the inner fillet of the breast cap meat. The inner and outer fillet separator acts as an outer fillet harvester by means of the two pivotable guide rods engaging the loose hanging outer fillet and harvests the outer fillet halves by unloading after the carrier has passed.

The tissue cutter can comprise inwardly and outwardly movable cutting knifes capable of being moved in a direction transverse to the path of conveyance and thereby are arranged for cutting tendon tissue when in use the cutting knifes are moved inwardly into engagement with the breast cap. The tissue cutter, thus acting as an inner fillet tendon cutter, cuts between the carcass and the inner fillet to enable a cleaner harvesting by the carcass separator, which separates and harvests the inner fillet.

The third breast fillet working unit amongst others can comprise inwardly and outwardly movable guides arranged for removing the inner fillet by movement of the inwardly and outwardly movable guides outwardly when engaging the breast cap meat. The third breast fillet working unit, which directly precedes the carcass separator, centers the inner fillet by pressing two forwardly protruding bones of the carcass for engagement by the associated carcass separator for harvesting the inner fillet.

The carcass separator, which is in association with the third breast fillet working unit, can comprise a pneumatically operated lifting arm arranged for lifting the carcass remains from the carrier. The carcass separator, acting effectively as an inner fillet harvester, scrapes the now almost loose inner fillet completely loose from the carcass by severing the remaining tendon tissue.

The described setup also allows harvesting of half breast fillets with the inner and out fillet parts attached to one another. This is accomplished by the various implements for performing the breast cap working steps allowing ready rearrangement for this purpose.

The least one breast cap carrier can include a spring biased clamp for holding a poultry breast cap on the carrier.

Figure 2:
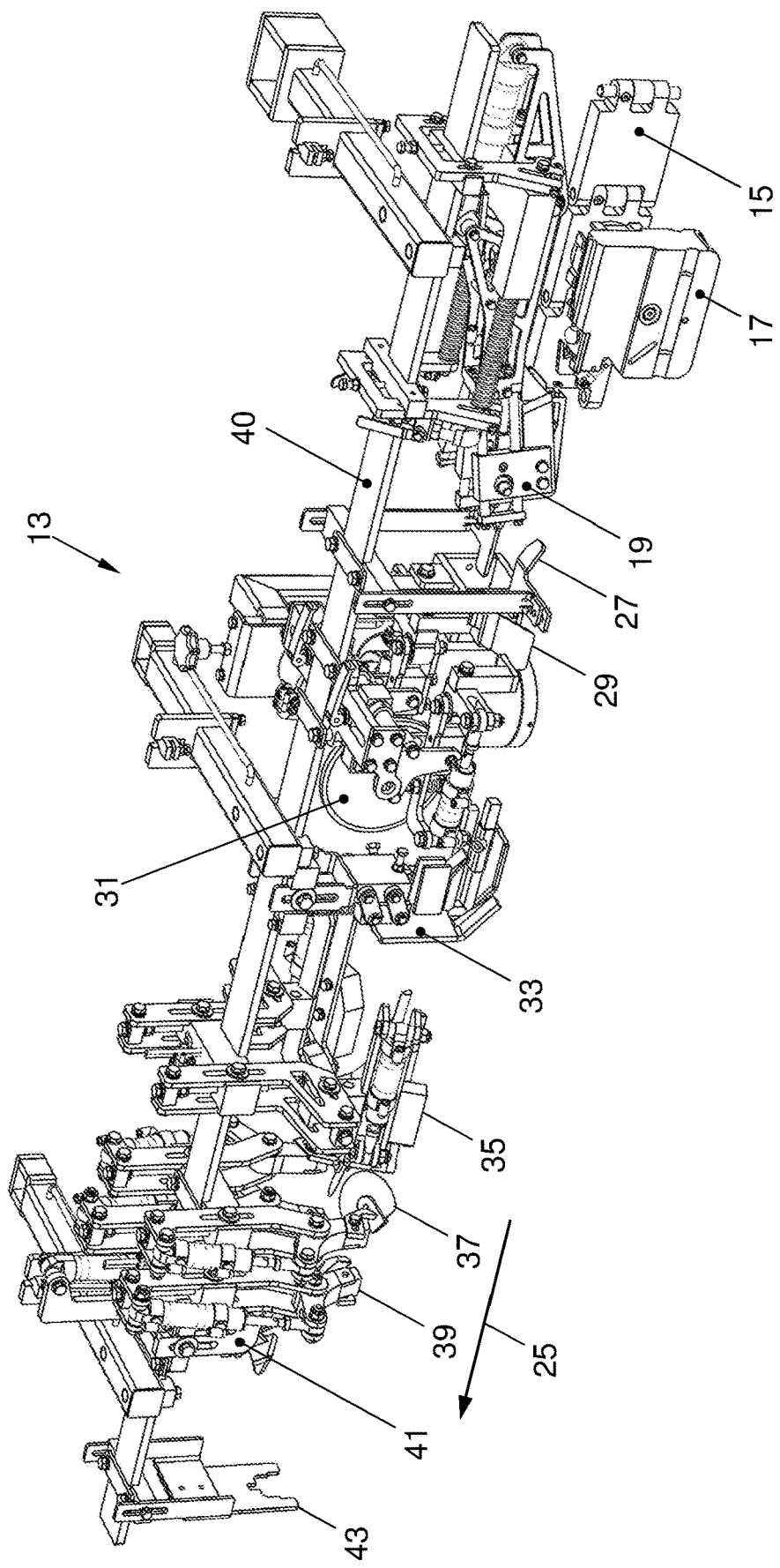
Figure 3:
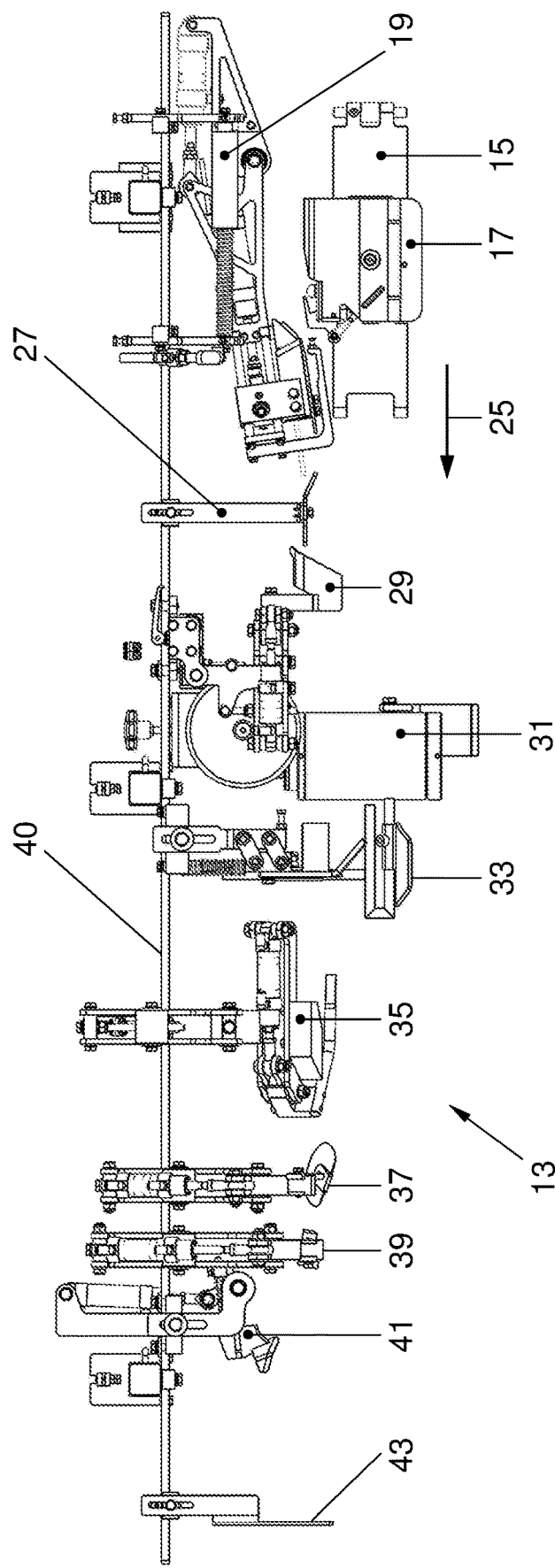
Figure 5:
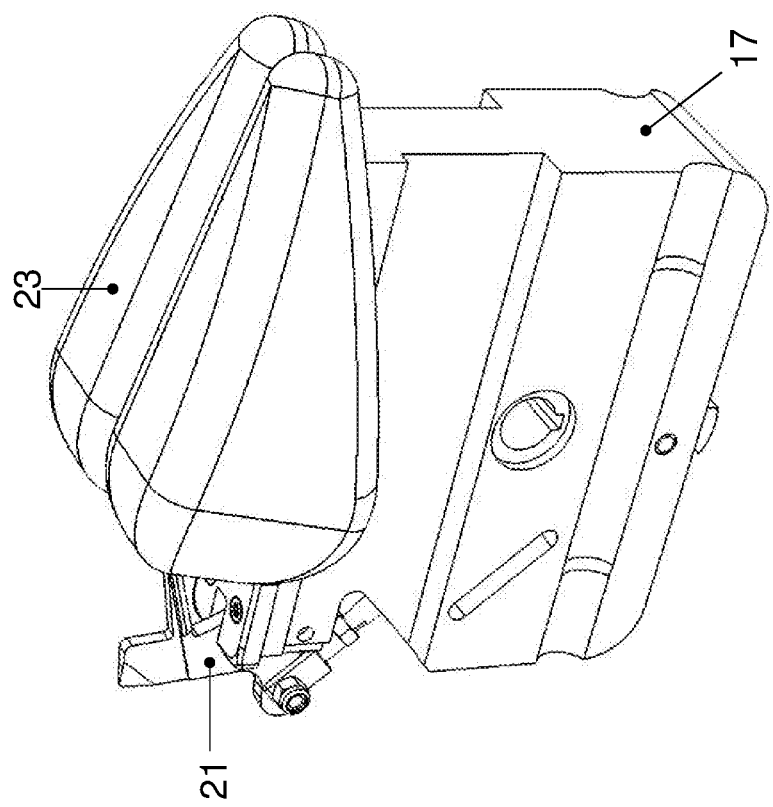
Figure 4:
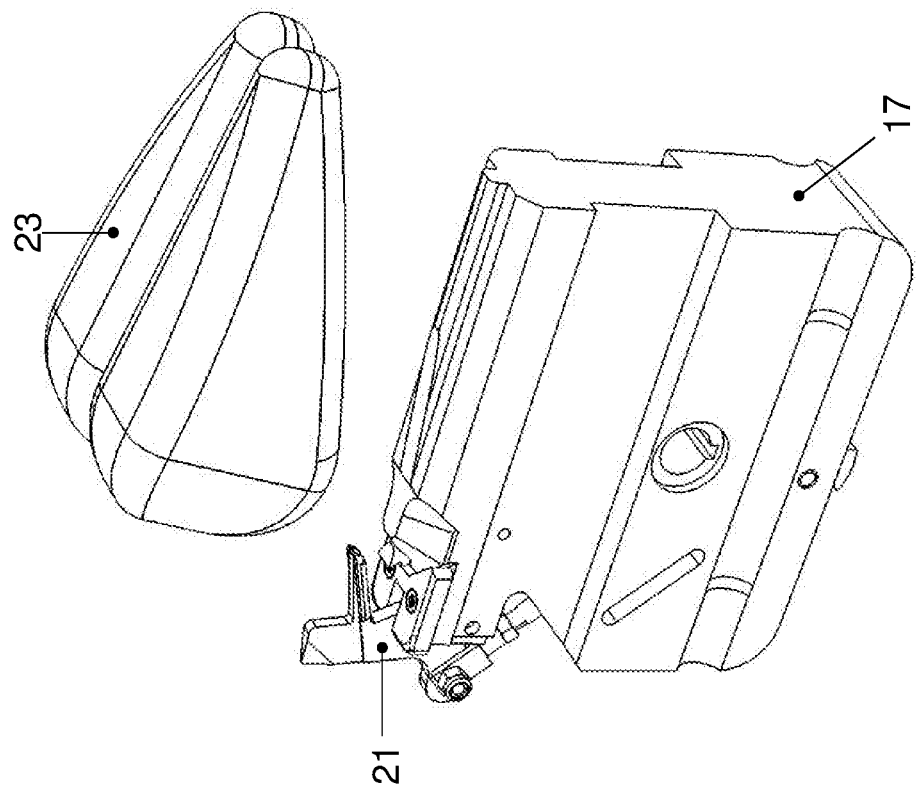
Figure 6:
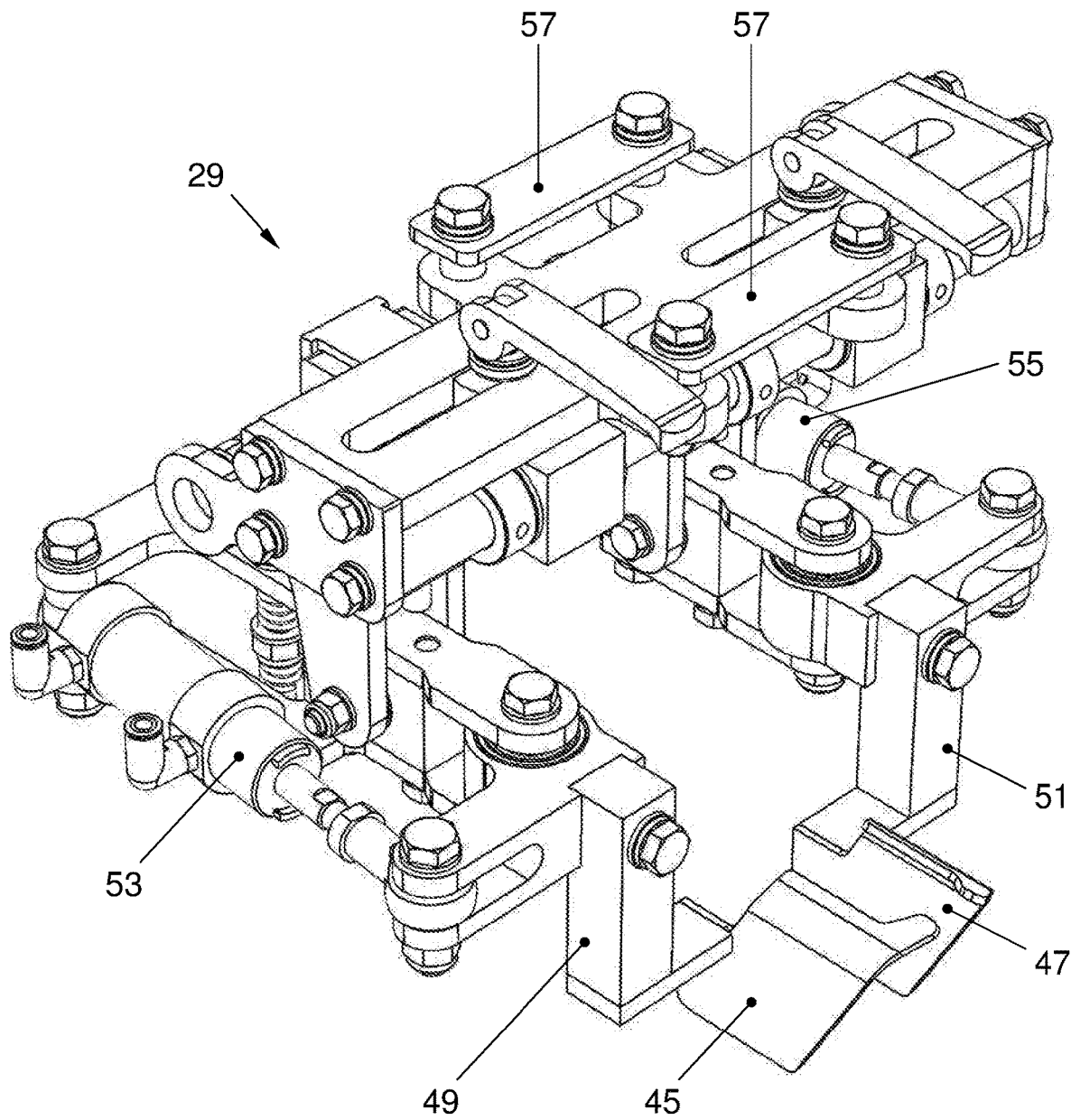
Figure 7:
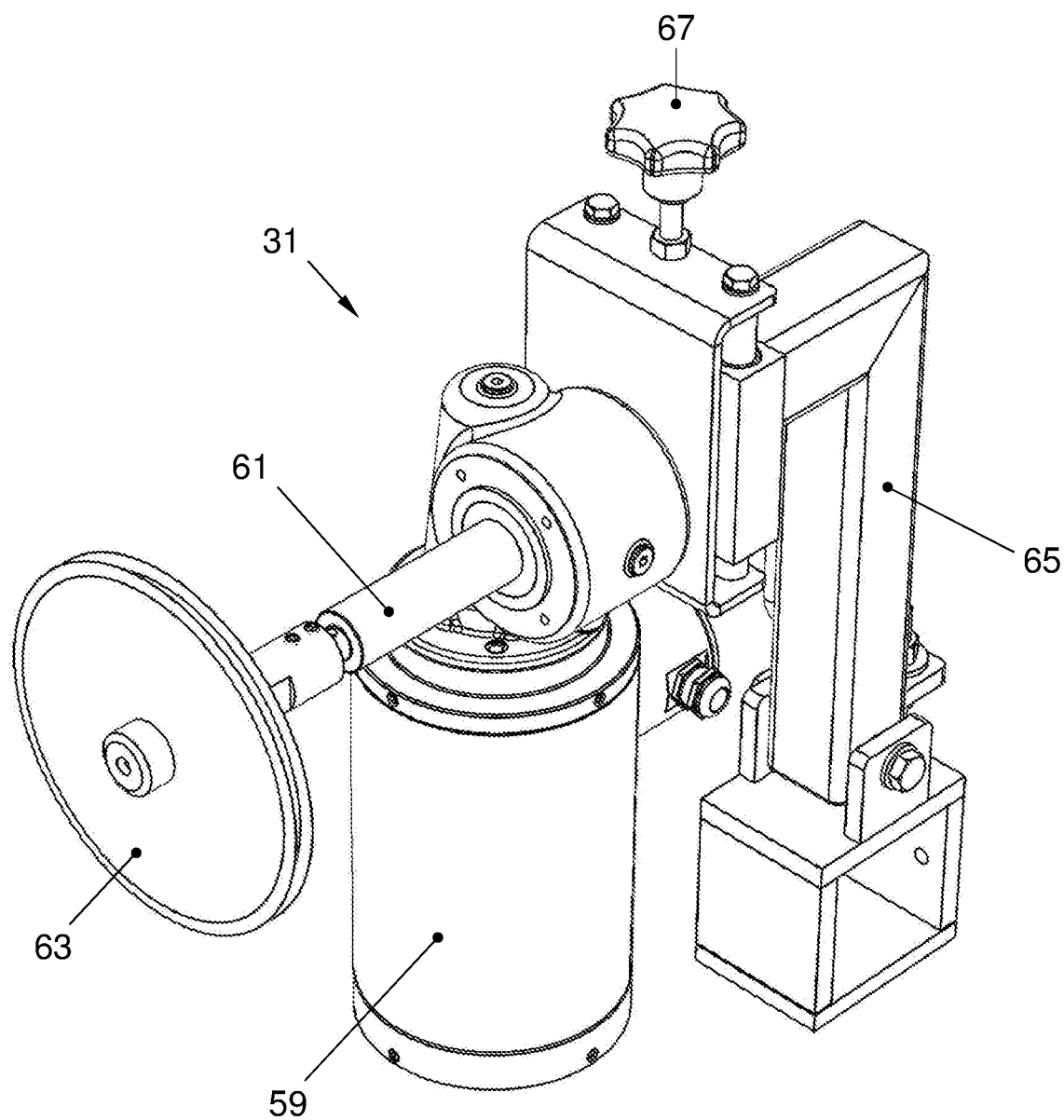
Figure 8:
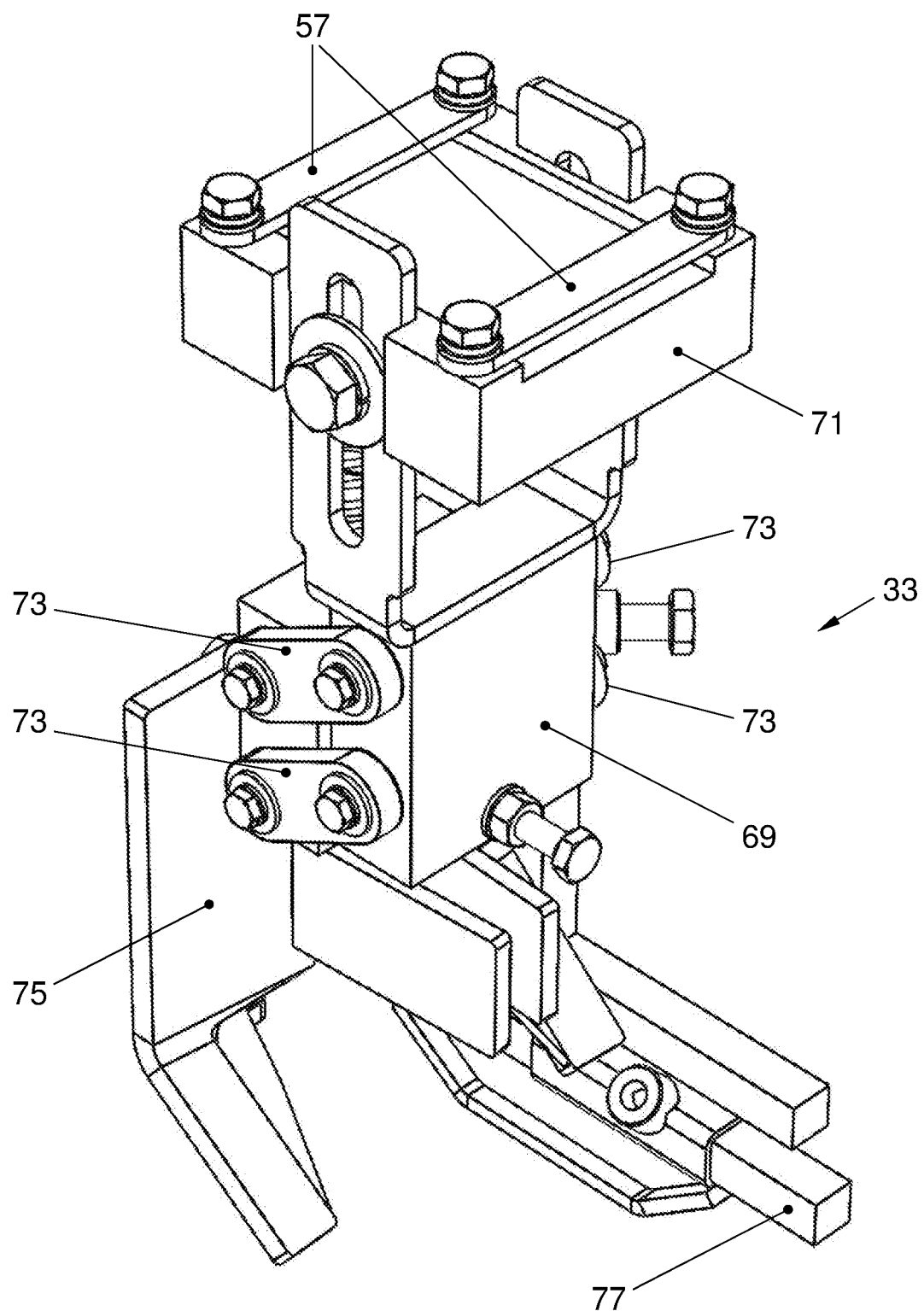
Figure 9:
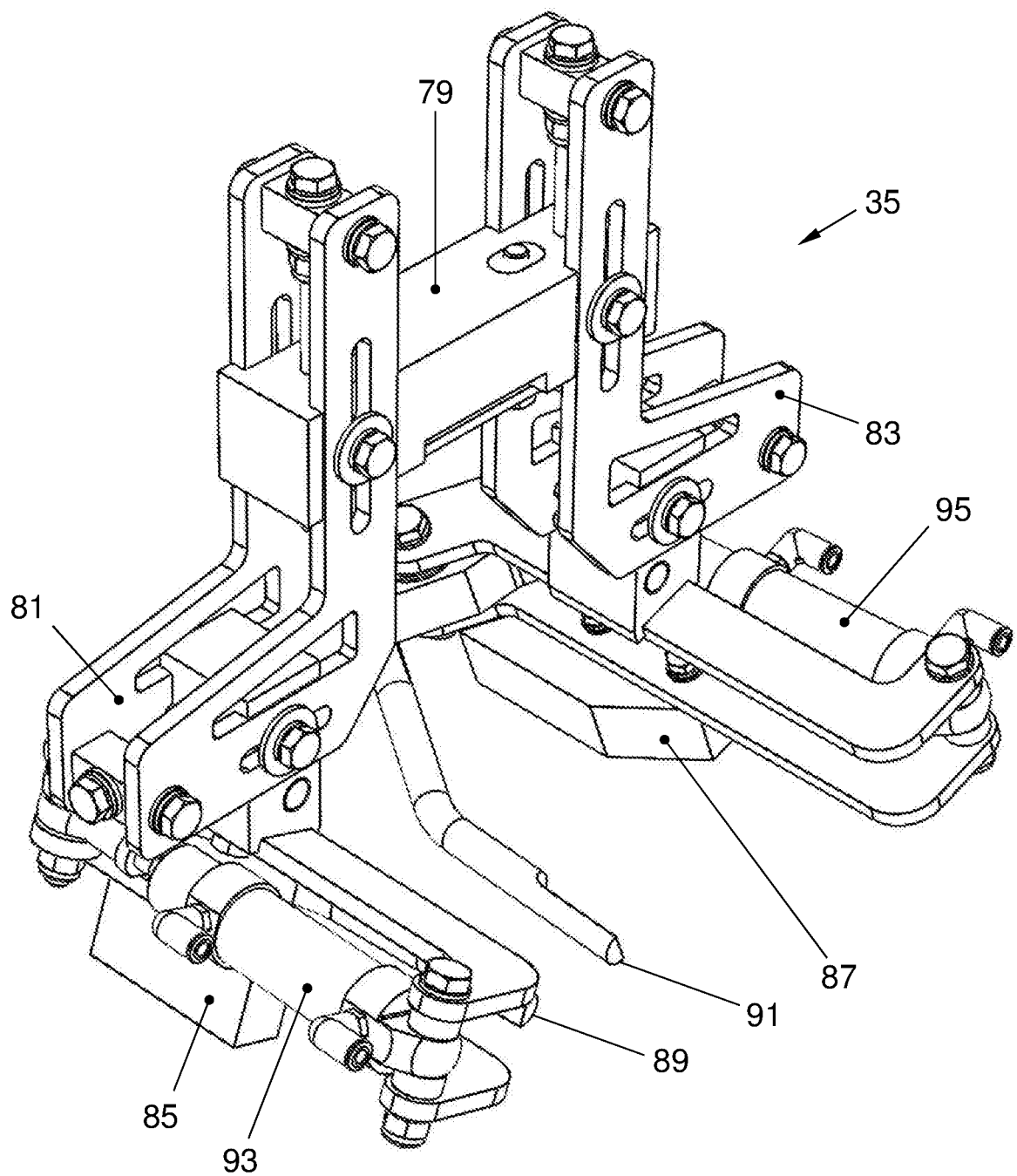
Figure 10:
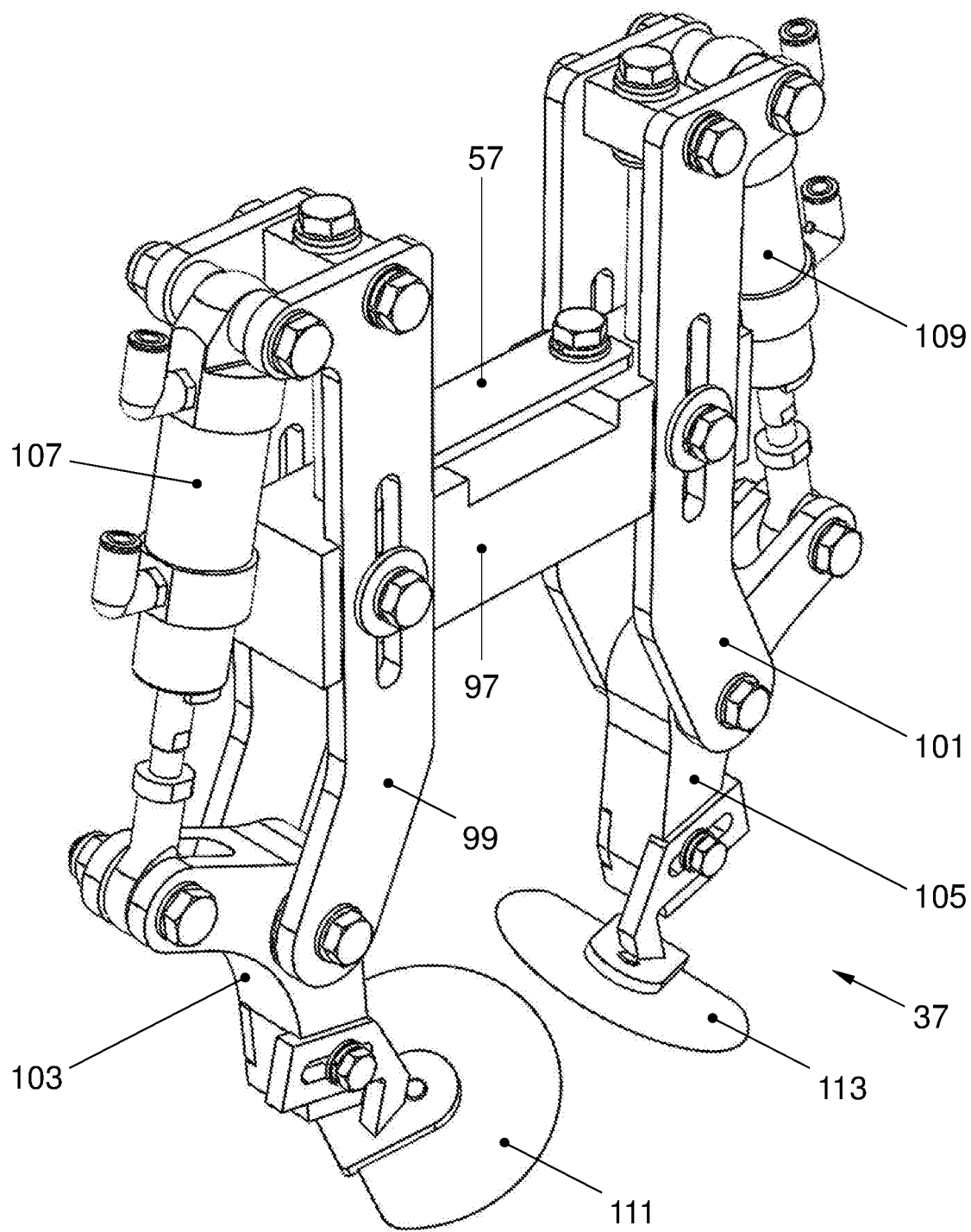
Figure 11:
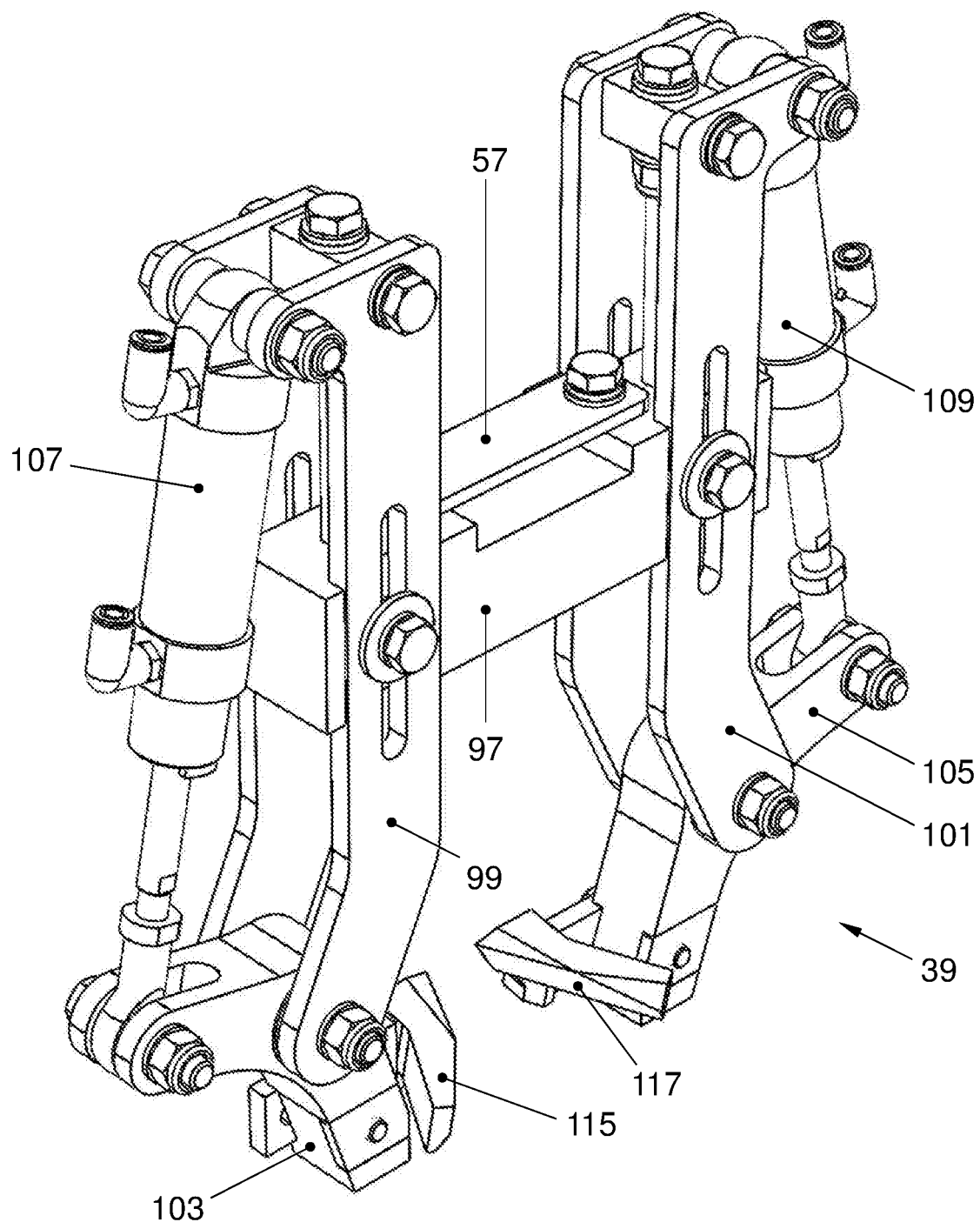
Figure 12:
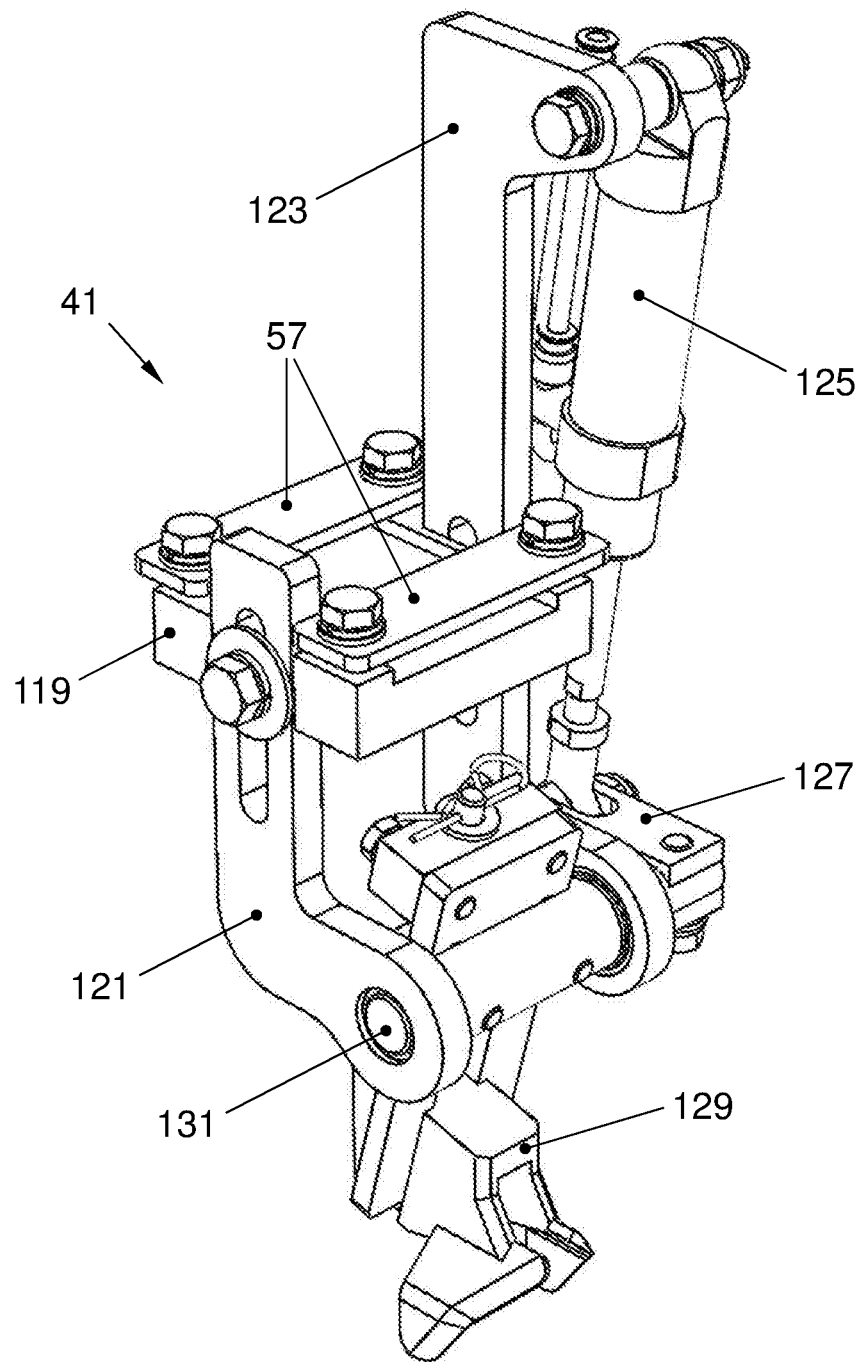

Advantageous aspects of the invention will become clear from the appended description and in reference to the accompanying drawings, in which:

FIG. 1 is an isometric view of a breast filleting machine;
FIG. 2 is an assembly for incorporation into the breast filleting machine of FIG. 1 for performing the method of the invention;
FIG. 3 is a side elevation of the assembly of FIG. 2;
FIG. 4 is a carrier for use with the machine and assembly in a position ready to receive a poultry breast cap;
FIG. 5 is the carrier of FIG. 4 with the poultry breast cap in position;
FIG. 6 is a first breast fillet working unit;
FIG. 7 is a breast fillet cutter;
FIG. 8 is a second breast fillet working unit;
FIG. 9 is an inner and outer fillet separator;
FIG. 10 is a tissue cutter;
FIG. 11 is a third breast fillet working unit; and
FIG. 12 is a carcass separator.

The machine 1 illustrated in FIG. 1 is generally of a type described in applicant's U.S. Pat. No. 9,078,453. It comprises a main frame 3, to which are attached a front cabinet 5 and a rear cabinet 7. The front and rear cabinets 5,7 can be closed by hatches 9, 10, 11. Behind the hatches on the rear cabinet 7 is housed an inner and outer breast filleting assembly 13. The inner and outer breast filleting assembly is shown in greater detail in FIGS. 2 and 3 and cooperates with an endless conveyor 15, which carries a plurality of breast cap carriers 17 through a path of conveyance extending in the machine 1. For clarity only one breast cap carrier 17 is shown in FIGS. 2 and 3, but the arrangement is well known and described in applicant's U.S. Pat. No. 9,078,453 as referred to above. On the right hand side of FIGS. 2 and 3 is shown a furcula removing apparatus. 19. This apparatus removes the furcular or wishbone from the carcass but is not part of the present invention. The furcular removing apparatus 19 is described in detail in applicant's co-pending patent application NL 2015436, entitled "Apparatus, system and method for removing furculae from poultry breast caps", and was filed on 19 Sep. 2015 in the Netherlands. As shown in FIGS. 4 and 5 the carrier body or mandrel 17 has a spring biased clamp 21 for holding a poultry breast cap 23 in an inverted position. FIG. 4 shows the breast cap 23 before being positioned on the carrier body 17, and FIG. 5 shows the breast cap 23 engaged over the carrier 17 while it is being held by the spring biased clamp 21.

Returning now to FIGS. 2 and 3 it is to be understood that each carrier 17 with a breast cap 23 in position thereon moves along the assembly 13 of FIGS. 2 and 3 from the right hand side to the left hand side in the direction of arrow 25. A breast cap 23, after its furcular bone has been removed by the apparatus 19, first engages a guide structure 27 which guides the meat of the breast cap for engagement by a first fillet working unit 29 (shown in FIG. 6). After passing the first fillet working unit 29 the carrier 17 moves the breast cap to a breast cutter 31 (shown in FIG. 7). From the breast cutter 31, which cuts the breast cap meat along its keel bone, the breast cap is moved to a second fillet working unit 33 (shown in FIG. 8). Upon passing the second fillet working unit 33, the breast cap engages an inner and outer fillet separator unit 35 (shown in FIG. 9). From the inner and outer fillet separator unit 35 the breast cap progresses to tissue cutting unit 37 (shown in FIG. 10) and thence to a combination of a third fillet working unit 39 (shown in FIG. 11), and an associated carcass separating unit 41 engaging the remaining breast cap meat forming the inner fillet or tender (further shown in FIG. 12). Effectively the third fillet working unit 39 acts as a guiding implement for the carcass separating unit 41, which removes the inner fillet or tender. Finally the breast cap carcass after removal of the inner and outer meat fillets is unloaded by the carcass unloader 43. The successive units are all mounted on a common frame beam 40.

Having now regard to FIG. 6, the first breast fillet working unit 29 is seen to have a pair of opposite tunnel plates 45, 47 each mounted on a respective arm element 49, 51. The arm elements 49, 51 are each pivoted about a vertically extending axis, so that the tunnel plates 45, 47 can be moved to and from the position shown in FIG. 6 by opposite pneumatic cylinders 53, 55. Mounting strips 57 are provided for mounting of the first breast fillet working unit 29 to the common frame strip 40 (shown in FIGS. 2 and 3). The first breast fillet working unit 29 acts as an outer fillet scraper, by scraping with the tunnel plates 45, 47 between the inner and outer fillet. This loosens the outer fillet and enhances harvesting by the second breast fillet working unit 33, which will act as an outer fillet harvester.

The breast cutter 31 as shown in FIG. 7, is seen to have a motor drive unit 59 for driving a shaft 61, which carries a double circular cutting blade 63. The double circular cutting blade 63 cuts the meat on each side of the keel bone of the breast cap, and is height adjustably mounted on an outrigger 65. Height adjustment is by means of knurled wheel 67. The breast cutter 31, which is optional, splits the outer breast fillet in half so that the outer fillets can be harvested in two halves.

The second breast fillet working unit 33 shown in FIG. 8 has a central body 69, which height adjustably depends from an overhead mounting base 71, which is attachable to the common frame beam 40 by means of mounting strips 57. The central body 69 has anchored thereto opposite parallel pivot arms 73, which carry an engagement member 75 for up-and-down movement parallel to the central body 69. The engagement member 75 has a guide structure 77, which passes centrally over the breast cap carrier 17. The second breast fillet working unit 33 scrapes the outer fillet and loosens a front part thereof for subsequent gripping by the inner and outer fillet separator 35 for harvesting the outer fillet halves. The engagement member 75 acts as a scraper plate and is mechanically lifted when it is engaged by a passing breast cap carrier 17.

The inner and outer fillet separator 35 shown in FIG. 9 has a mounting bracket 79 for mounting over the common frame beam 40. Depending opposite side frames 81, 83 are height adjustably mounted to the mounting bracket 79, and each carry a respective guide block 85, 87. Mounted on each guide block 85, 87 is a pivotable guide rod 89, 91. The pivotable guide rods 89, 91 can each be pivoted by means of a respective pneumatic actuator 93, 95. The pivotable guide rods 89, 91 separate the inner and outer fillets of the breast cap meat. The inner and outer fillet separator 35 harvests an outer fillet by means of its two pivotable guide rods 89, 91 engaging the now loose hanging outer fillet and harvests the outer fillet halves by unloading after the breast cap carrier 17 has passed.

The tissue cutter 37 shown in FIG. 10 attaches to the common frame beam 40, by means of a base block 97 and mounting strip 57. The base block 97 forms an attachment for opposite actuator carriers 99, 101, which are height adjustably mounted thereto. Bell cranks 103, 105 are pivotally mounted to the opposite actuator carries 99, 101 and can be actuated by respective pneumatic actuator 107, 109 to move tissue cutting knifes 111, 113 inwardly and outwardly. The tissue cutter 37 is effective as an inner fillet tendon cutter, and cuts between the carcass and the inner fillet to enable a cleaner harvesting by the carcass separating unit 41, which will finally separate the carcass from the inner fillet and harvests the inner fillet.

The third fillet working unit 39 as shown in FIG. 11 has a very similar arrangement as the tissue cutter of FIG. 10. The third fillet working unit 39 uses an identical mounting block 97 carrying identical opposite actuator carriers 99, 101 and bell cranks 103, 105. The bell cranks 103, 105 can be moved by similar pneumatic actuators 107, 109. At their lower ends, however, the bell cranks 103, 105 carry opposite guides 115, 117, which can be moved in and out by the actuators 107, 109. The third breast fillet working unit 39, which directly precedes the carcass separator 41 associated therewith, centers the inner fillet by pressing against two forwardly protruding bones of the carcass for engagement by the associated carcass separator 41 for enhancing harvesting of the inner fillet.

The carcass separator 41 shown in FIG. 12 is directly associated with the preceding third fillet working unit 39, and has a mounting base 119 for mounting to the common frame beam 40 by means of mounting strips 57. The mounting base 119 again height adjustably carries first and second frame elements 121, 123. The second frame element 123 is extended upwardly to provide anchorage for a pneumatic actuator 125. The pneumatic actuator 125 acts on an arm 127, which pivots a lifting arm 129 for lifting the carcass remains from the breast cap carrier when it passes underneath the carcass separator 41. The lifting arm 129 is pivoted about a transverse shaft 131. The carcass separator 41 harvests the inner fillet by scraping the now almost loose inner fillet completely loose from the carcass by severing the last remaining tendons retaining to the carcass.

Hence there is described a method and device for carrying out the method of mechanically harvesting inner and outer meat fillets from a poultry carcass breast cap. A poultry breast cap 23 is conveyed while being supported inversed to its natural position on a carrier 17 through a path of conveyance 25. The outer fillet is cut along a keel bone of the poultry breast cap 23 to enable separation of the inner and outer fillets. After separation and successive harvesting of the outer and inner breast fillets the carcass remains are discarded. The device 1, 13 for carrying out the method comprises various means 15, 17, 29, 31, 33, 35, 37, 39, 41, 43 as described above for performing at least the steps of conveying, separating and harvesting inner and outer breast fillets, and discarding carcass remains.

While a setup has been described for separately harvesting outer and inner fillets, it is to be understood that the various implements for performing the breast cap working steps can also be arranged to enable harvesting of half breast fillets with the inner and out fillet parts attached to one another.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A device for harvesting meat fillets from a poultry breast cap, comprising:
   an endless conveyor extending along a predefined path of conveyance;
   at least one breast cap carrier arranged for being moved through the predefined path of conveyance by the endless conveyor;
   a first breast fillet working unit positioned in the path of conveyance;
   a breast cutter downstream of the first breast fillet working unit in the path of conveyance;
   a second fillet working unit downstream of the breast cutter in the path of conveyance;
   an inner and outer fillet separator unit downstream of the breast cutter in the path of conveyance;
   a tissue cutting unit down stream of the inner and outer fillet separator in the path of conveyance;
   a third fillet working unit downstream of the tissue cutting unit in the path of conveyance; and
   a carcass separator unit downstream of the third fillet working unit in the path of conveyance.

2. The device of claim 1, further comprising a carcass unloader downstream of the carcass separator unit in the path of conveyance defined by the conveyor.

3. The device according to claim 1, further comprising a common frame beam extending parallel to the path of conveyance for mounting one or more of the means for performing at least the steps of conveying, separating inner and outer breast fillets, and discarding carcass remains as defined in claim 1, while attaching same by mounting strips engaging over the common frame beam.

4. The device according to claim 1, wherein the first breast fillet working unit comprising a pair of opposite arm elements each carrying a tunnel plate, together forming a pair of laterally movable tunnel plates, and opposite pneumatic cylinders for moving the opposite tunnel plates to and from one another.

5. The device according to claim 1, wherein the breast cutter comprises a motor drive unit for rotatably driving a double circular cutting blade.

6. The device according to claim 5, wherein the double circular cutting blade is height adjustable with respect to the path of conveyance.

7. The device according to claim 1, wherein the second breast fillet working unit has an up-and-down movable engagement member connected to a guide structure, and wherein the guide structure is arranged for engagement by the at least one breast cap carrier for positioning of the engagement member.

8. The device according to claim 1, wherein the inner and outer fillet separator comprises pivotable guide rods operated by pneumatic actuators for separation of the outer fillet from the inner fillet of the breast cap meat.

9. The device according to claim 1, wherein the tissue cutter comprises inwardly and outwardly movable cutting knifes capable of being moved in a direction transverse to the path of conveyance arranged for cutting tissue when in use the cutting knifes are moved inwardly into engagement with the breast cap.

10. The device according to claim 1, wherein the third breast fillet working unit comprises inwardly and outwardly movable guides arranged for removing the inner fillet by movement of the inwardly and outwardly movable guides outwardly when engaging the breast cap meat.

11. The device according to claim 1, wherein the carcass separator comprises a pneumatically operated lifting arm arranged for lifting the carcass remains from the carrier.

12. The device according to claim 1, wherein the least one breast cap carrier includes a spring biased clamp for holding a poultry breast cap.

* * * * *